Figure 1:
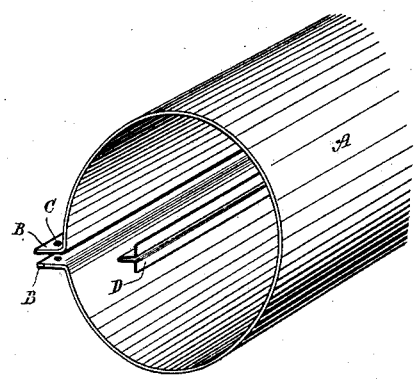

(No Model.)

J. C. BAYLES.
PIPE OR TUBING.

No. 431,028. Patented July 1, 1890.

Witnesses:
Raphael Netter
Ernest Hopkinson

Inventor
James C. Bayles
by
Duncan Curtis & Page
Attorneys.

THE NORRIS PETERS CO., PHOTO-LITHO., WASHINGTON, D. C.

UNITED STATES PATENT OFFICE.

JAMES C. BAYLES, OF EAST ORANGE, NEW JERSEY.

PIPE OR TUBING.

SPECIFICATION forming part of Letters Patent No. 431,028, dated July 1, 1890.

Application filed February 27, 1890. Serial No. 341,995. (No model.)

*To all whom it may concern:*

Be it known that I, JAMES C. BAYLES, of East Orange, in the county of Essex and State of New Jersey, have invented certain new and useful Improvements in Pipes or Tubing, of which the following is a description, reference being had to the accompanying drawings.

The present invention relates especially to pipes or tubing for conveying gases or liquids under high pressure, and particularly for conveying very subtle liquids or gases; and the object of the invention is to provide a tight joint for seams of such pipes when they are made from metallic sheets or plates, which sheets are shaped to the circle of the pipe and have outwardly-bent flanges at their sides or edges, and the flanges of the sheet or sheets are secured together by rivets. I have found that when a pipe of this construction is submitted to internal pressure, and even to a pressure considerably within its working capacity, there is a tendency of the plates to lift or be forced bodily away from each other, and this, of course, tends to bend and separate the flanges of the seams, so that, though when the pipe is manufactured these flanges are practically at right angles to the body portions of the pipe, after considerable use of the pipe they will be found to be separated inside the line of the rivets, or the angles made obtuse. It will also be seen that with such a seam and the pipe sustaining fluctuating pressure there must be some spreading apart and closing together of the inner or angle portion of the flanges within the range of the elasticity of the metal of which the pipe is composed. This action at the seams of flanged pipes is not ordinarily so great as to be taken into account, especially in common water-pipes, for at most but small leaks could occur, and for water-pipes these are immaterial, and the strength of the pipe as a whole is not affected by such spreading of the inner edges of the flanges. In the case of pipe of this kind used for conveying very subtle or poisonous gases or air or gases under very high pressure, even a slight leakage becomes objectionable; but flanged pipe of this kind has all the merit of strength and cheapness, as contrasted with the seamless pipe employed for conveying subtle and high-pressure gases, and it is therefore desirable to produce it with seams that shall be effectively tight under all conditions of use. On the other hand, the opening and closing action of the flanges of the seams is such that cement or calking applied to the inside of the pipe or between the flanges in the usual way is soon loosened or displaced, and it therefore becomes necessary to employ sealing devices that will not be affected by the slight opening and closing of the flanges of the seam.

Accordingly my invention consists of a strip or piece of suitable metal applied to the inside of the pipe and over the opening of the seam or between the flanges, such strip being permanently fastened along its opposite sides or edges to the body of the pipe.

Figure 2:
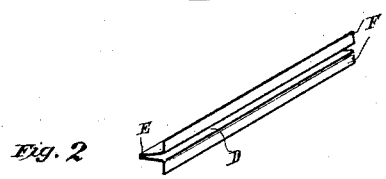
Figure 3:
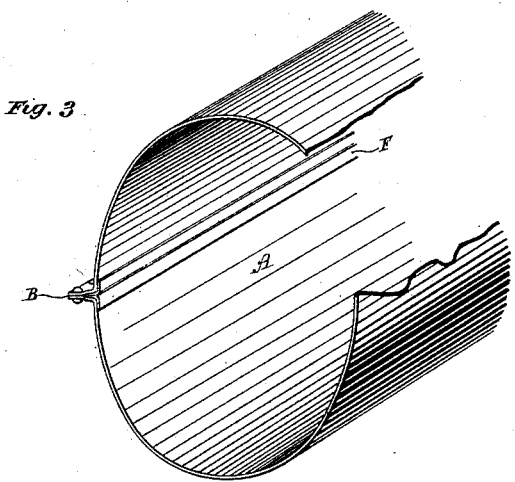

In the drawings, Figure 1 is a perspective view of a portion of a formed pipe-section blank having seam-flanges, the flanges being not riveted together, and a portion of one form of a seam-sealing strip also being shown. Fig. 2 shows in detail the seam-sealing strip. Fig. 3 shows a view of a portion of a completed pipe having its side broken away to expose the seam.

In the views, A indicates the pipe-body or metal sheet composing the same. In the present case the pipe is shown as composed of one sheet or plate, and as having but one seam, but obviously there may be two or more plates, each shaped to the circle of the pipe and joined to one another along two or more longitudinal seams. This blank is shaped along its opposite edges with outwardly-bent flanges B, which are punched with rivet-holes C, and the pipe is formed by cylindrically shaping the blank so as to bring the opposite flanged edges together, Fig. 1, and then fastening the flanges together by rivets, or by similarly shaping and riveting together separate blanks when more than one plate is used to complete the cylinder.

D is the form of sealing-strip that I prefer. It may be composed of thin sheet-copper or any other suitable metal and is shaped as shown—that is, it is folded upon itself along its central line, so as to produce the doubled or insertion portion E, from which extend the edges F in opposite directions, these edges being shaped to approximately the inside curve of the pipe.

The adjacent faces and angles of the flanges of the pipe are to be brightened and tinned, or otherwise similarly prepared, before being riveted together, and the outside surfaces of the fold E and of the flanges F of the strip D are also to be tinned. The doubled portion E of the strip is then inserted between the flanges of the pipe till its edges F are in contact with the body of the pipe, and the flanges are riveted together in the usual way.

The riveting together of the flanges causes the insertion E to be tightly clasped between and held by the flange, with its edges tightly pressed against the body of the pipe. Heat is now to be applied to the strip D, which is done with a heated soldering-iron by the application to the strip of a blow-pipe flame, or by subjecting the seam portions to heat applied exterior to the pipe-body, which causes the edges of the strip to be soldered or sweated to the body of the pipe.

The extent of the union between the strip and the material of the pipe-body may vary according to the requirements of strength and tightness of the seam and according to the material used for the strip. So, too, there are various ways in which this strip may be secured to the body of the pipe that are well known to those familiar with this art, and I do not therefore confine myself to any particular method. Any of the methods of forming an attachment by soldering, brazing, or sweating may suffice. So, too, I do not limit myself to any particular form of sealing-strip, as the extent and depth of the folded portion thereof will depend upon the elasticity or ductility of the metal composing it and upon the amount of compensation required of it. It is, however, essential that this strip be secured to the body of the pipe on opposite sides of the seam, and that it have such flexibility or yielding capacity that its central portion will yield in accordance with the opening or closing of the flanges of the seam and remain in an unbroken condition, though closely impacted in the seam-opening. In this way I produce a cheap pipe of great strength and durability, having seams that remain at all times effectively or hermetically closed, even when such pipe be used for conveying subtle gases or fluids under very high pressures.

What is claimed as new is—

1. A metal pipe having externally-projecting seam-flanges and a sealing-strip of metal covering the inner opening of the seam-flanges and attached along its opposite edges to the body of the pipe, whereby the seam is tightly closed, and leaks by the opening and closing of its flanges are prevented.

2. The combination, in a pipe, of the sheet-metal body A, having the outwardly-projecting and riveted seam-flanges B, and the folded sealing-strip D, inserted between said flanges from the inside of the pipe and attached along its edges F to the body of the pipe, substantially as and for the purpose set forth.

3. The combination, in a pipe, of the sheet-metal body A, having the outwardly-projecting and riveted flanges B, and the sealing-strip D, having its fold E inserted between and attached to the flanges B, and having its edges F lying upon and secured to the inner surface of the pipe, substantially as and for the purpose set forth.

JAMES C. BAYLES.

Witnesses:
ROBT. F. GAYLORD,
ERNEST HOPKINSON.